UNITED STATES PATENT OFFICE.

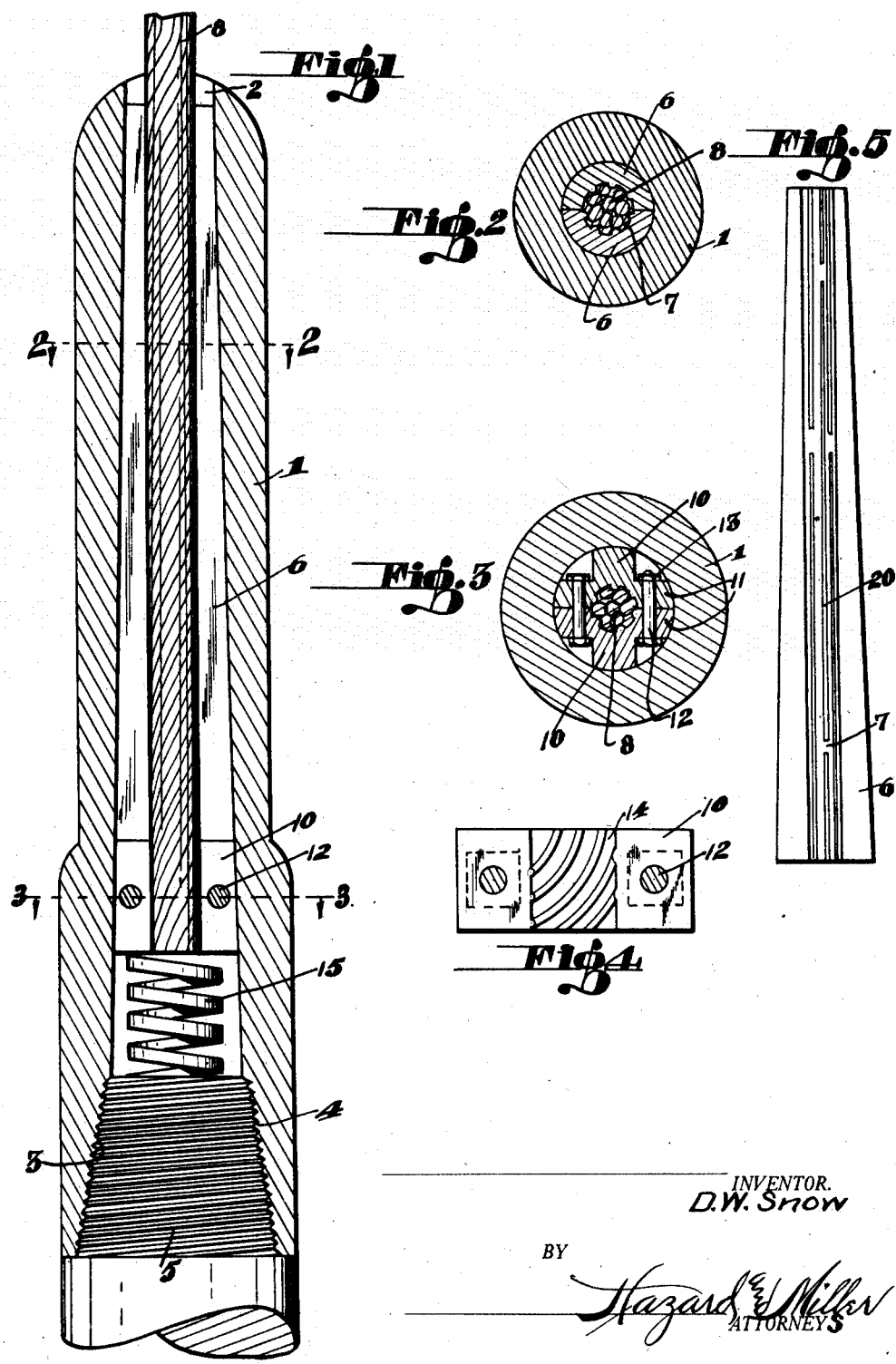

DANIEL WILLIAM SNOW, OF FILLMORE, CALIFORNIA.

WIRE-ROPE SOCKET.

1,390,830.  Specification of Letters Patent.  Patented Sept. 13, 1921.

Application filed June 11, 1920. Serial No. 388,097.

*To all whom it may concern:*

Be it known that I, DANIEL WILLIAM SNOW, a citizen of the United States, residing at Fillmore, in the county of Ventura and State of California, have invented new and useful Improvements in Wire-Rope Sockets, of which the following is a specification.

This invention relates to wire rope sockets for drilling tools and the like, and has for its object the provision of a clamping connection between a socket and a wire rope which will positively clamp the end of the wire rope within the socket without necessitating the employment of Babbitt metal or the like.

The invention will be readily understood from the following description of the accompanying drawings, in which—

Figure 1 is a longitudinal section through a socket constructed in accordance with the invention.

Figs. 2 and 3 are transverse sections on the lines 2—2 and 3—3 of Fig. 1.

Fig. 4 is a side elevation of one of the sections of the clamp employed in the improved socket.

Fig. 5 is a side elevation of one of the slips for the socket.

The improved socket comprises a usual cylindrical member 1 having the axial bore 2 extending through the same with the lower end of said axial bore tapering as shown at 3 and provided with threads 4 to form the box end of a joint with the usual tapering threaded pin end 5 of a tool. The axial bore above the tapering box end 3, preferably, tapers in width throughout the length of the socket, the upper end of said tapering bore being of the smaller diameter. Slips 6 are received within the axial bore 2 at the upper portion of the socket, said slips being relatively long and extending throughout substantially the greater portion of the length of said axial bore.

The slips employed are shown as two in number of semi-cylindrical conformation and are arranged at their meeting faces with coöperating axial recesses 7 which together form an axial aperture in which a usual wire rope 8 is arranged to be received. The slips 6 are tapered throughout their length so as to snugly fit within the tapering bore 2, the parts being so arranged that when the wire rope 8 is drawn upwardly the slips will be wedged in the tapering bore 2 so as to firmly clamp the wire rope 8.

Coöperating clamping members 10 are received within the axial bore 2 below the ends of slips 6, these clamping members fitting snugly within said bore and having coöperating lugs 11 throughout which extend bolts 12 provided with nuts 13 for detachably clamping the clamping members to the end of the wire rope 8 which projects below the ends of slips 6. The meeting faces of the clamping members 10 are provided with coöperating axial recesses 14 which are, preferably, spirally grooved to conform to the lay of the strands comprising wire rope 8. By this arrangement when the clamping members are clamped upon the end of the wire rope the strands of the latter being received in the grooves provided in recesses 14, will cause the clamping members to positively engage the end of the wire rope.

A spring shown as a coil spring 15 is, preferably, provided within the socket 1 between the ends of clamping members 10 and the end of the pin 5 of the tool attached to the socket. This spring will tend to force the clamping members 10 and the slips 6 lengthwise of the socket so as to cause wedging engagement of said clamping members and slips in the tapering bore 2 of the socket. By this arrangement if the wire rope 8 becomes slack longitudinal displacement of the slips and clamping members will be prevented by spring 15.

By the construction as thus set forth it will be seen that the wedging engagement of slips 6 in the tapering bore of the socket will firmly clamp the wire rope 8 and the engagement between the wire rope and the clamping members 10 will provide additional means for positively connecting the wire rope to the socket.

In practice it may be found desirable to longitudinally corrugate the recesses 7 in slips 6 as shown at 20 in Fig. 5, as by this arrangement a firmer gripping action may be had between the slips and the wire rope 8, and said corrugations will also prevent turning of the rope relatively to the slips and thus overcome the tendency of the rope to twist.

Various changes may be made without departing from the spirit of the invention as claimed.

What is claimed is:

1. A rope socket having a tapering bore, tapering slips received within said bore and arranged to engage a rope, and a clamp comprising a separable collar received within said bore beyond said slips and arranged to be clamped to said rope.

2. A rope socket having a bore, slips received in said bore and engaging a rope, and coöperating clamping members received in said bore beyond said slips, said clamping members having coöperating axial recesses spirally grooved to engage the strands of a rope, and means for clamping said members to the rope.

In testimony whereof I have signed my name to this specification.

DANIEL WILLIAM SNOW.